April 23, 1963 A. H. FAULKNER 3,087,019
TERMINAL PER STATION IDENTIFICATION CIRCUIT
Filed March 30, 1960
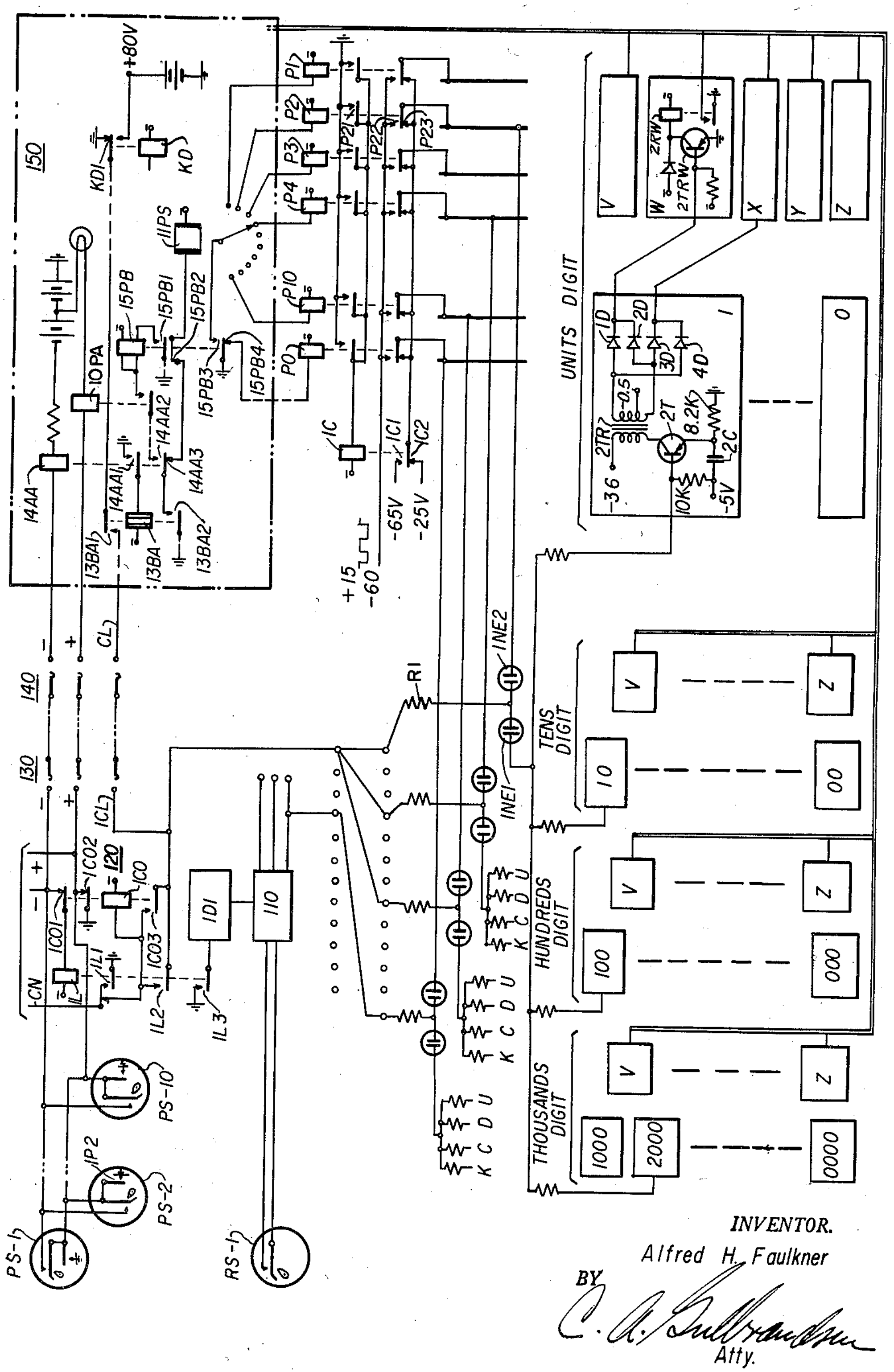
INVENTOR.
Alfred H. Faulkner
BY
C. A. Gulbrandsen
Atty.

3,087,019
TERMINAL PER STATION IDENTIFICATION CIRCUIT

Alfred H. Faulkner, Redondo Beach, Calif., assignor to Automatic Electric Laboratories, Inc., Northlake, Ill., a corporation of Delaware Filed Mar. 30, 1960, Ser. No. 18,721
15 Claims. (Cl. 179—17)

The present system relates to automatic toll ticketing telephone systems and more particularly to line and party detecting apparatus. Specifically, the present invention relates to line and party detecting apparatus of a type particularly adapted to be incorporated in an automatic recording telephone system of the character disclosed in the co-pending application of J. E. Ostline and J. W. Taugner, Serial No. 650,508, filed April 3, 1957, now Patent No. 3,046,342.

In an automatic toll ticketing telephone system the detector is that unit of equipment which automatically detects the directory number of a subscriber station, when that station initiates a toll call. This number becomes part of a call record which is automatically recorded at the termination of each completed toll call. Earlier type detectors in present use, arranged to detect individual line station and party line station directory numbers are limited in that, though they are capable of detecting party line stations arranged for terminal per station service, these station terminals require a relay and tube individual to each station terminal. Their terminal per station method of providing party station service in automatic exchanges is well-known and widely used. It is especially adapted to maintain efficient distribution of connector traffic in an exchange and to be able to economically maintain existing directory listings when party service subscribers move within an exchange area. The terminal per station party service plan with frequency-per-terminal ringing is now rapidly coming to the fore for new exchange installations. This party station service by means of the frequency per terminal method permits each terminal number to be treated individually because any terminal number in an exchange may be associated with any party or frequency group. Under this method the significance of a party hundred terminal group in a detection process is absent and facilities must be provided so that any individual terminal may be associated with or jumpered to any party or frequency group.

In the disclosure of Patent No. 2,773,127, issued to I. V. Coleman on December 4, 1956, only one of the terminals of a party line appear in a particular hundred group of subscriber terminals. This permits use of a simple line identification scheme wherein a +80 volt potential is applied to one side of all the neon lamps individual to a terminal but common to a line, and a −50 volt potential is applied to the other side of only the lamp corresponding to the particular terminal being identified. The −50 volt potential is applied through a sensitive relay common to the hundreds group which includes the selected terminal. Operation of the sensitive relay operates slave relays to switch the "C" or normal leads of all one hundred lines to a common multiple to extend the +80 volt potential marking from the "C" lead and also marks the appropriate "thousandths" and "hundredths" leads of the common multiple. However, this arrangement is not applicable when the system is arranged to permit any party to be given any terminal number without limitation. To provide identification in such a generalized case the system disclosed in the co-pending application of J. E. Ostline, Serial No. 625,833, filed December 3, 1956, now Patent No. 3,024,316, was devised. This uses a relay and neon lamp per subscriber terminal. One side of all neon lamps on a line is marked by a +80 volt potential over the "C" lead and the other side of only one of these lamps is connected to a −50 volt potential in accordance with the party identification derived by the ticketer. The selected lamp strikes and operates the associated relay which marks the appropriate leads.

Accordingly, it is an object of the present invention to provide in a telephone system of the type noted an improved line detector which is operated substantially instantaneously to identify a calling station directory number in response to the application of an identifying potential impressed upon the calling line.

It is an ancillary object of this invention to provide a detector that can service exchanges arranged for terminal and frequency per station service at a lower cost.

It is a feature of this invention to provide an arrangement for identifying the calling party on a party line by alternatively rendering conductive a first and then a second gas tube individual to that party station.

It is a further feature of the invention to provide a detector comprising only a pair of gas filled discharge devices of the two element type individual to each station of each line of the telephone system and a plurality of settable registers which are controlled in response to the conductivity of any one of the devices to register a multi-digit designation corresponding to the directory number of the identified calling station.

A further feature of the invention is to provide, in an automatic telephone system including party lines which are arranged on a terminal per station and frequency per terminal basis, an improved detector provided with a pair of gas filled discharge devices for each substation on each of the party lines of the system and which are operated incident to the extension of the connection from the given station on a given party line to render effective only the gas filled discharge devices individual to that station thereby to identify only the given station on the given party line as a calling station.

Another feature of this circuit is the use of a neon tube "gate" to provide an operation equivalent to that performed by the relay and neon lamp at present.

Still another feature of this circuit is that all four digits are marked directly from a gate output.

Further objects and features of the invention pertain to the particular arrangement of the circuit elements of the system whereby the above outlined objects and additional operating features are attained. The invention both as to its organization and method of operation together with further objects and advantages thereof will be best understood by reference to the following specification taken in connection with the accompanying drawing.

An automatic toll ticketing telephone system serves a large metropolitan area and adjacent suburban areas which are divided into a number of offices, each of which includes one or more exchanges. Each exchange in each office comprises a ten thousand terminal unit although it may not be initially installed to serve its ultimate capacity. Each exchange terminates subscribers' lines connected to subscriber stations that are identified by four numerical digits. Consequently, any subscriber station in any exchange in any national toll area may be identified by the usual directory number comprising a code portion including three digits representing respectively the first two letters of the office name and a digit representing the number of the exchange in the office and a numerical portion including four digits identifying a terminal of a particular station. It is to be noted that the directory numbers of the party subscribers substation require no suffix digit, in view of the fact that all of the party lines are arranged on a terminal per station basis and consequently each of the stations on each of the party lines is provided with an individual four digit number identifying the particular terminal of the party station.

*General Arrangement of the Telephone System*

The telephone exchange equipment illustrated comprises automatic switching apparatus serving 10,000 terminals, one of the terminals terminating the line of the regular subscriber substation RS–1 and ten of the terminals terminating the line of the ten party subscriber substations PS–1, and PS–2 to PS–10. The switching equipment comprises a number of line circuits individually associated with the subscriber lines terminating in the exchange. For example, the line circuit 110 terminates the line of the regular subscriber substation RS–1 and the line circuit 120 comprised of relays 1L and 1CO terminates the line of the party line subscriber substations PS–1 to PS–10. The subscribers are rendered free automatic local service within their own exchange and the exchanges of their metropolitan area but are automatically ticketed for the toll charges to all exchanges outside their metropolitan area.

The switching equipment of the exchange also includes a group of finder switches, including the finder switch 130 which has access to the line circuits 110 and 120. Each of the finders is individually associated with a primary selector, such as the primary selector 140. The primary selectors have access through their banks to the local switch train including the second selectors and connectors etc. not shown, and for toll calls to the ticketer 150, part of which is shown on the drawing and its associated equipment which is not shown. The various selectors and connectors are of conventional construction and operation.

In considering the detector shown it should be noted that it is connected to each of the line equipment terminals of each of the subscriber lines terminating in the exchange, and that it is associated with each of a plurality of ticketers in an exchange, such as the ticketer 150 through a detector assigner which is not shown.

Each subscriber substation is provided with the usual substation apparatus, including in the telephone instrument, a ringer and a calling device or dial. The calling devices disposed at the regular subscriber substations such as the substation RS–1 are of conventional construction and arrangement. The calling devices disposed at the party subscriber substations, such as PS–1, PS–2, etc. are of special construction and arrangement as disclosed in the patent application of John E. Ostline, now Patent No. 2,822,424, issued February 4, 1958. The special dials of the type disclosed in the aforesaid patent, in addition to the set of impulse springs, are provided with a set of cam springs which are utilized to identify the position of the calling subscriber substation on the associated party line. The cam springs serve to transmit a ground pulse from the calling device during the closed period of the impulse springs after the pulse corresponding to the party's position on the line.

The drawing shows a terminal per station identification circuit in an automatic exchange. Referring now to the drawing, it will be assumed that station PS–2 desires to make a call, and the ensuing operations will be described. Station PS–2 is one of ten stations. Two of the other stations on this ten-party line are shown as stations PS–10 and PS–1, connected to a two conductor circuit, the (+) positive and (−) negative conductors, extending to the automatic exchange. It will be noted that the stations are equipped with a dial of the type disclosed in the Patent Number 2,822,424, well-known to the art and the telephone is connected to the telephone line conductors in a well-known manner.

When the receiver is removed at station PS–2 or the handset of a monophone type telephone is lifted from its cradle, a circuit is closed at the hookswitch (not shown) of the telephone, this circuit can be traced as follows: ground at contacts 1CO2, the positive line conductor, the switch-hook spring set, contacts of the dial, the negative (−) line conductor, contact 1CO1 of relay 1CO, the winding of relay 1L to battery, operating relay 1L. Relay 1L at make contact 1L1 connects ground to the CN lead. Two additional circuits are closed by the operation of relay 1L, that is, at contacts 1L2 and 1L3. Contact 1L3 connects ground to the distributor 1D1, of the well-known type. The distributor operates to set in motion a line finder 130 to search for the calling line. The line finder 130 performs a vertical movement of its shaft and wipers, followed by a horizontal movement of the wipers and as soon as the wiper of the finder makes contact with the lead 1LC, the finder stops, relay 1CO, in the line circuit is operated through this wiper contact, from ground in the finder (not shown), lead 1LC, contact 1L2 (of relay 1L which operated previously) winding of relay 1CO to battery, operating relay 1CO. It should be noted that a second circuit to the winding of relay 1CO is closed at contact 1CO3 which completes a holding circuit for relay 1CO. This is required because the operating circuit of relay 1CO will be opened at contact 1L2 when relay 1L restores, following the operation of relay 1CO. It should be noted here that, at the moment the finder wiper stopped on lead 1LC, as explained above, the other wipers also made contact with the two leads (+) and (−) respectively, thus completing the calling subscriber's line circuit to the first selector, represented by the wipers. The above noted switching apparatus, including the line circuit, the distributor 1D1, the line finder 130 and the first selector 140 may be of conventional construction and arrangement and may be, for example, of the type disclosed in Patent No. 2,289,896, and in Patent No. 1,849,694.

The line finder is permanently connected directly to a first selector. At the moment of seizure of the calling subscriber's line by the line finder and the extension of the subscriber's line circuit to the selector, a well-known action takes place, the negative line (−) is connected to battery through one winding of a selector line relay (not shown) and the positive line (+) is connected through another winding of the same line relay to ground. The selector line relay operates a second or release relay (not shown) to furnish ground back over the lead 1LC. Ground from the selector 140 over the 1LC lead constitutes the holding means for all switches in the train up to the selector 140.

The first digit "9" can now be dialed, the selector 140 (details not shown) will respond and lift its wipers to the ninth level, automatic rotation will then take place and the wipers will stop on the first idle contact group of level nine, which will, in this instance, be a set of contacts representing ticketer 150. An action typical of step-by-step circuitry takes place, the line relay 14AA of the ticketer 150 is operated, a second or release relay 13BA operates in turn to place ground on the "CL" lead which is the holding ground for the complete train of switches.

As mentioned earlier, subscribers on party lines require extra party-identity mechanism and contacts in the dial. Whenever "0" (zero) is dialed, this mechanism sends one ground pulse. The location of this pulse varies from party to party on the line. The ground pulse is normally applied to the + line conductor. In a dial in good adjustment the ground pulse is applied while the loop is closed and has no effect on normal loop-pulsed switching selections.

At the time the caller reaches the ticketer, and while the caller dials the access-code final digit "0" (zero) into the ticketer, the special circuit shown in FIG. 1 is utilized. During this spotter-dial checking interval, the dial loop pulses interrupt a circuit which contains not the regular central-office battery but an extra spotting-interval battery and polarized relay 10PA. With the party-identity contacts open as shown, polarized relay 10PA does not operate.

While the caller dials "0" (zero) into the ticketer, relay 14AA follows the dial pulses, and sends pulses simultaneously into rotary switch 11PS (party switch) and also to other portions of the circuit not shown.

At the end of the loop pulse coinciding with the caller's party-number in this assumed condition the second pulse, the dial pulse-springs re-close, party switch 11PS steps to the position coinciding with the caller's party-number, and the spotter-dial extra cam mechanism closes the dial's party-identity contacts 1P2. The current flow through polarized relay 10PA is now in such a direction that polarized relay 10PA operates, and operates relay 15PB (pulse blocking) which locks. Relay 15PB opens the pulsing path toward party switch 11PS, and grounds the party-switch wiper, thus grounding in relay group P1–P10 the party-numbered lead corresponding to the calling station's party position.

Should the caller be an individual-line subscriber as RS–1, his dial has no party-identity mechanism, and although party switch 11PS will receive all 10 loop pulses, relay 15PB remains unoperated, and so does not ground party No. 10 lead P10 but individual-line lead relay P0 through other control circuits shown only by the dotted lead.

A moment after polarized relay 10PA operates, the caller's dial opens its party-identity springs 1P2, polarized relay 10PA restores, and (except in the case of party No. 10) the dial pulsing springs interrupt the loop again. Relay 14AA follows the remainder of the 10 loop pulses. But, with relay 15PB locked, party switch 11PS remains where it stopped.

A moment after the caller has dialed "0" properly into the ticketer, relay 14AA comes to rest, a slow-release relay (not shown) restores, and operates circuits not here disclosed which remove polarized relay 10PA and the spotter battery, and substitute regular central-office battery. Relay 14AA will follow subsequent dial pulses to repeat area-and/or office-code digits to the associated circuits, and to permit all called-number digits to be marked into the ticketer for storage.

Upon completion of the pulsing of digit "0" into the ticketer, relay KD operates (via a circuit not shown) to replace ground with a +80 volts upon the CL lead back through the selector, linefinder and calling stations line equipment to all of the neon lamps associated with that line equipment.

Relay 15PB, upon operating, also grounded the wiper of party switch 11PS which is resting upon a contact numbered to correspond to the calling party's number. A circuit is thus completed from ground at contacts 15PB3 wiper of switch 11PS to relay P2, as assumed earlier that station PS2, upon operating, completes a path from ground at its contacts to common relay 1C and at contacts P22 connects on alternating current to all of the neon lamps corresponding to party position number two.

The group of relays P1–P10 and P0 mark the party-line commons, in accordance with the party identification derived from the SATT dial pulse. In the present circuit alternating current is applied to the selected party lead and the rest are connected to −25 volts from the back contacts of the unoperated P1–P0 relays. The −25 volt potential is not essential, since no current other than that required to charge the shunt capacity of the wiring flows over the party leads to which this potential is applied, but it is provided to eliminate any uncertainty.

Each terminal is provided with a 220 K ohm resistor such as R1, extending from the "CL" lead to the junction of the two type NE–2 neon lamps such as INE1 and INE2. The other terminal of one of these lamps is connected to a terminal of the party line commons P–1 to P–0. The other terminal of the second neon lamp is connected to the junction of four one-megohm resistors. Each of these resistors marks one digit of the terminal number in a 10,000 terminal office.

The "CL" lead is normally at either ground or −50 volts. In either case this results in 25 volts across both neon lamps. If the party terminal was normally connected to −65 volts, the shunt INE1 lamp would not strike but might hold on 65 volts if fired by a transient, hence the −25 volt potential normally applied provides maximum assurance against undesired lamp operations. When a ticketer, or its equivalent, seizes the identification circuit, it operates one of the relays P1 to P0 to identify the desired party and extends +80 volts over the "CL" lead to the line circuit. A low frequency 20 or 60 cycles, alternating voltage of about 20 v. R.M.S. is applied to the other terminal by the party relay P2 to facilitate amplification of the gate output. As previously assumed relay P2 is operated, it connects the alternating current to lead P2 and operates a common relay 1C which connects −65 v. to leads P1 and P3 to P0. In the case of the terminal circuits jumpered to leads P1 and P3 to P0 the shunt lamps have 40 volts more applied across their terminals than the associated series (right lower) lamps, hence the shunt lamps strike and limit the voltage applied to the series lamps to about 25 volts, thus preventing their operation. In the case of the terminal circuit jumpered to the selected lead P2, which is the circuit shown, the series lamp INE2 conducts alternatively with lamp INE1. In this case when the series lamp strikes it extends the marking on the "CL" lead to the four commons connected to its output. A current of about 100 microamperes flows through the series lamp, providing a signal of about 25 microamperes to each of the four commons. This signal is modulated from about zero to twice its average value by the alternating voltage signal, thus providing an alternating voltage of 5 to 10 millivolts at the inputs to the amplifiers connected to each of the common points corresponding to the selected terminal.

The 5 to 10 millivolt alternating voltage applied to the input of the units digit (1 digit) amplifier is raised about 40 db by the first transistor 2T and is coupled through the transformer 2TR in its collector circuit to the base input of the second transistor 2TRW through rectifying diodes 1D, 2D, 3D and 4D. The second transistor 2TRW functions as a power detector to operate the relay 2RW in its collector circuit on the rectified and amplified signal. A by-pass capacitor 2C smooths the output and increases the detection efficiency. The relay operates and grounds the "W"-lead output to operate the corresponding register relay in the ticketer 150, or its equivalent. Obviously the output can be converted to binary or codel codes in the identification circuit, if desired, by conventional circuitry.

While only one embodiment of the invention has been disclosed, it will be understood that various modifications may be made therein which are within the true spirit and scope of the invention.

What is claimed is:

1. In a telephone system, a subscriber station identified by a multi-digit designation, a first and a second multi-electrode gas filled tube individual to said station, a station marking conductor connected to one electrode of said first tube, a line marking conductor connected to one of said electrodes of each of said tubes, a plurality of resistors individual to said station connected to another of said electrodes of said second tube, a plurality of coding amplifiers, one terminal of each of said plurality of resistors connected to one of each of said plurality of coding amplifiers, a plural digit register, switching means controlled in response to a call from said station for connecting said station to said register, a source of potential, means in said register operated in response to said connection for connecting said source of potential to said line marking conductor, control means selectively operated from said station for completing a circuit including said source of potential and said station marking conductor and said first tube in order to render said first tube conductive, said second tube rendered conductive in response to the conductivity of said first tube, and means including said plurality of coding amplifiers controlled by the operation of said second tube for operating said plural digit register to simultaneously register said multi-digit station designation.

2. In a telephone system, a plurality of subscriber lines, a calling subscriber line identified by a multi-digit designation, a first and a second two element discharge device individual to said line, a station marking conductor connected to one of said elements of said first device, a line marking conductor connected to one of said elements of each of said devices, a plurality of resistors individual to said line connected to the other of said elements of said second device, a plurality of coding amplifiers, one terminal of each of said plurality of resistors connected to one of each of said plurality of coding amplifiers, a plural digit register, switching means controlled in response to a call from said line for connecting said station to said register, a source of potential, means in said register operated in response to said connection for connecting said source of potential to said line marking conductor, control means selectively operated from said line for completing a circuit including said source of potential and said station marking conductor and said first device in order to render said first device conductive said second device rendered conductive in response to the conductivity of said first device, and means including said plurality of coding amplifiers controlled by the operation of said second device for operating said plural digit register to simultaneously register said multi-digit line designation.

3. In a toll ticketing telephone system, a party line subscriber station identified by a multi-digit designation having a pulsing means, a first and a second two electrode gas filled electronic device individual to said station, a station marking conductor connected to one of said electrodes of said first device, a line marking conductor connected to one of said electrodes of each of said devices, a plurality of resistors individual to said station connected to the other of said electrodes of said second device, a plurality of coding amplifiers, one terminal of each of said plurality of resistors connected to one of each of said plurality of coding amplifiers, a plural digit register, a plurality of station marking conductors terminating in said register, switching means controlled in response to a call from said station for connecting said station to said register, a source of potential, means in said register operated in response to said connection and said subscriber station pulsing means for connecting said source of potential to said station marking conductor corresponding to said subscriber's position on said line, control means selectively operated from said station for completing a circuit including said source of potential and said line marking conductor and said first device to render said first device conductive, said second device rendered conductive in response to the conductivity of said first device, and means including said plurality of coding amplifiers controlled by the conductivity of said second device for operating said plural digit register to simultaneously register said multi-digit station designation.

4. In a telephone system, a subscriber station identified by a multi-digit designation, a first and a second two electrode gas filled electronic device individual to said station, a station marking conductor connected to one of said electrodes of said first device, a line marking conductor connected to one of said electrodes of each of said devices, a plurality of resistors individual to said station, one terminal of each said resistors connected to the other of said electrodes of said second device, the number of said resistors corresponding to the number of digits of said plural digit designation to be detected, a plurality of groups of amplifiers, each group of amplifiers comprising ten amplifier units, each amplifier unit in said group corresponding to a number from 1 through 9 and 0, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, one each of said plurality of resistors connected to one of said amplifier units in each said group of amplifiers, each of said resistors connected to an amplifier corresponding to each of said digits of said plural digit designation of said subscriber station, a plural digit register, switching means controlled in response to a call from said station to connect said station to said register, a source of potential, relay means in said register operated in response to said connection to connect said source of potential to said line marking conductor, control means selectively operated from said register to complete a circuit including said source of potential and said line marking conductor and said first device to render said first device conductive, said second device rendered conductive in response to the conductivity of said first device, and means including said amplifiers connected to said plurality of resistors controlled by the operation of said second device to operate said amplifiers to operate said coding detectors, coding relay means in said coding detectors operated upon operation of said detector to operate said plural digit register to simultaneously register said multi-digit station designation.

5. In a telephone system, a plurality of subscriber lines, a calling one of said subscriber lines, said subscriber lines each identified by a multi-digit designation, a first and a second two electrode gas filled electronic device individual to each of said lines, a station marking conductor connected to one of said electrodes of said first device, a line marking conductor connected to one of said electrodes of both said first and said second device, a plurality of resistors individual to said line, one terminal of each said resistors connected to the other of said electrodes of said second device, the number of said resistors corresponding to the number of digits of said plural digit designation to be detected, a plurality of groups of amplifiers, each group of amplifiers comprising ten amplifier units, each amplifier unit in said group corresponding to a number from 1 through 9 and 0, a plurality of groups of coding detectors, each group of coding detectors comprising five detector units, each group of coding detectors associated with each group of amplifiers, each detector unit in said group of coding detectors corresponding to an element of two-out-of-five element self-checking combinational code, one each of said plurality of resistors connected to one of said amplifier units in each said group of amplifiers, each of said resistors connected to an amplifier corresponding to each of said digits of said plural digit designation of said subscriber line, a plural digit register, switching means controlled in response to a call from said calling line to connect said line to said register, a source of potential, relay means in said register operated in response to said connection to connect said source of potential to said station marking conductor, control means selectively operated from said register to complete a circuit including said source of potential and said line marking conductor and said first device to render said first device conductive, in order to render said second device conductive, and means including said amplifiers connected to said plurality of resistors controlled by the operation of said second device to operate said amplifiers to operate said coding detectors, coding relay means in said coding detectors operated upon operation of said detector to operate said plural digit register to simultaneously register said plural digit line designation.

6. In a toll ticketing telephone system, a 10,000 terminal office, a subscriber station identified by a four-digit designation within said office, a first and a second two electrode gas filled electronic device individual to said station, a station marking conductor connected to one of said electrodes of said first device, a line marking conductor connected to one of said electrodes of each of said devices, four resistors individual to said station, one terminal of each said resistors connected to the other of said electrodes of said second device, four groups of amplifiers, each group of amplifiers comprising ten amplifier units, each amplifier unit in said group corresponding to a number from 1 through 9 and 0, four groups of coding detectors, each group of coding detectors comprising five detector units, each group of coding detectors associated with each group of amplifiers, each detector unit in said group of coding detectors corresponding to an element of a two-out-of-five element self-checking combinational code, one each of said plurality of resistors connected to one of said amplifier units in each said group of amplifiers, each of said resistors connected to one amplifier in a group corresponding to one of said digits of said four digit designation of said subscriber station, a plural digit register, switching means controlled in response to a call from said station to connect said station to said register, a source of potential, relay means in said register operated in response to said connection to connect said source of potential to said line marking conductor, control means selectively operated from said station to complete a circuit including said source of potential and said station marking conductor and said first device in order to render said first device conductive, said second device rendered conductive in response to the conductivity of said first device, and means including said amplifiers connected to said plurality of resistors controlled by the operation of said second device to operate said amplifiers to operate said coding detectors, coding relay means in said coding detectors operated upon operation of said detector to operate said plural digit register to simultaneously register said four digit station designation.

7. In a toll ticketing telephone system, a party line subscriber station identified by a multi-digit designation and having a pulsing means, a first and a second two electrode gas filled electronic device individual to said station, a station marking conductor connected to one of said electrodes of said first device, a line marking conductor connected to one of said electrodes of each of said devices, a plurality of resistors individual to said station, one terminal of each said resistors connected to the other of said electrodes of said second device, the number of said resistors corresponding to the number of digits of said plural digit designation to be detected, a plurality of groups of amplifiers, each group of amplifiers comprising ten amplifier units, each amplifier unit in said group corresponding to a number from 1 through 9 and 0, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, the other terminal of each of said plurality of resistors connected to an amplifier unit in each said group of amplifiers corresponding to each of said digits of said plural digit designation of said subscriber station, a plural digit register, switching means directively controlled in response to said pulsing means upon initiation of a call from said station to connect said station to said register, a first source of potential, a second source of potential, a calling party position marking relay, means operated by said calling party marking relay to apply said second potential to said party marking conductor, marking means in said register operated in response to said connection and the further operation of said pulsing means to operate said party marking relay, control means selectively operated from said register to complete a circuit including said second source of potential and said first source of potential and said first device in order to operate said second device, and means including said amplifiers connected to said plurality of resistors controlled by the operation of said second device to operate said amplifiers to operate said coding detectors, coding relay means in said coding detectors operated upon operation of said detector to operate said plural digit register to simultaneously register all of the digits of said plural digit station designation.

8. A system as claimed in claim 7, where said first potential is positive eighty volts.

9. A system as claimed in claim 7, where said second potential is an alternating current swinging from a positive fifteen volts to a negative sixty volts.

10. In a toll ticketing telephone system, a 10,000 terminal office, a plurality of subscriber party lines, each said party line having a plurality of party subscriber stations identified by a four-digit designation within said office and each equipped with a pulsing means, a first and a second two electrode gas filled electronic device individual to each of said stations, a station marking conductor connected to one of said electrodes of said first device for each party subscriber, a line marking conductor connected to one of said electrodes of each of said devices associated with a particular line, a group of four resistors individual to said station, one terminal of all of said resistors connected to the other of said electrodes of said second device, said resistors each corresponding to one of the digits of said four digit designation to be detected, four groups of amplifiers, each group of amplifiers comprising ten amplifier units, each amplifier unit in said group corresponding to a number from 1 through 9 and 0, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, means for connecting one of each of said four resistors to one of said amplifier units in each group of amplifiers, each of said resistors connected to an amplifier corresponding to each of said digits of said four-digit designation of said subscriber station, a plural digit register, switching means directively controlled in response to said pulsing means upon initiation of a call from said station to connect said station to said register, a first source of potential, a second source of potential, a third source of potential, a calling party position marking relay, means operated by said calling party marking relay to apply said second potential to said party marking conductor, marking means in said register operated in response to said connection and the further operation of said pulsing means to operate said party marking relay, control means selectively operated from said register to complete a circuit including said second source of potential and said first source of potential and said first device in order to operate said second device, and means including said amplifiers connected to said plurality of resistors controlled by the operation of said second device to operate said amplifiers to operate said coding detectors, coding means in said coding detectors operated upon operation of said detector to operate said plural digit register to simultaneously register said plural digit station designation.

11. In a toll ticketing telephone system, a 10,000 terminal office, a plurality of subscriber party lines, each said party line having a plurality of party subscriber stations identified by a four-digit designation within said office and each equipped with a pulsing means, a first and a second two electrode gas filled electronic device individual to each of said stations, a station marking conductor connected to one of said electrodes of said first device for each party line subscriber station, a line marking conductor connected to one of said electrodes of each of said devices associated with a particular line, a group of four resistors individual to each said station, one terminal of all of said resistors connected to the other of said electrodes of said second device, said resistors each corresponding to one of the digits of said four digit designation to be detected, four groups of amplifiers, each group of amplifiers comprising ten amplifier units, each amplifier unit in said group corresponding to a number from 1 through 9 and 0, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, means for connecting one of each of said four resistors to one of said amplifier units in each said group of amplifiers, each of said resistors connected to an amplifier corresponding to each of said digits of said four-digit designation of said subscriber station, a plural digit register, switching means directively controlled in response to said pulsing means upon initiation of a call from said station to connect said station to said register, a first source of potential, a second source of potential, a third source of potential, a plurality of party position marking relays, make contact means on each said party position marking relay, said make contact means operated by said party marking relay corresponding to said calling party position to apply said second potential to said party marking conductor, marking means in said register operated in response to said connection and the further operation of said pulsing means to operate said party marking relay, control means selectively operated from said register to complete a circuit including said second source of potential and said first source of potential and said first device in order to fire said first device, said second device rendered conductive in response to the firing of said first device, and means including said amplifiers connected to said plurality of resistors controlled by the operation of said second device to operate said amplifiers to operate said coding detectors, coding relay means in said coding detectors operated upon operation of said detector to operate said plural digit register to simultaneously register said plural digit station designation.

12. In a toll ticketing telephone system, a 10,000 terminal office, a plurality of subscriber party lines, each said party line having a plurality of party subscriber stations identified by a four-digit designation within said office and each equipped with a pulsing means, a first and a second two electrode gas filled electronic device individual to each of said stations, a station marking conductor connected to one of said electrodes of said first device for each party line subscriber station, a line marking conductor connected to one of said electrodes of each of said devices associated with a particular line, a group of four resistors individual to each said station, one terminal of all of said resistors connected to the other of said electrodes of said second device, said resistors each corresponding to one of the digits of said four digit designation to be detected, four groups of amplifiers, each group of amplifiers comprising ten amplifier units, each amplifier unit in said group corresponding to a number from 1 through 9 and 0, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, means for connecting one of each of said four resistors to one of said amplifier units in said group of amplifiers, each of said resistors connected to an amplifier corresponding to each of said digits of said four-digit designation of said subscriber station, a plural digit register, switching means directively controlled in response to said pulsing means upon initiation of a call from said station to connect said station to said register, a first source of potential, a second source of potential, a third source of potential, a plurality of party position marking relays, make contact means on each said party position marking relay, said make contact means operated by said party marking relay corresponding to said calling party position to apply said second potential to said party marking conductor, break contact means on each said party position marking relay, said break contact effective on each said unoperated party position marking relay to extend said third source of potential to each said electronic device not associated with said calling station, marking means in said register operated in response to said connection and the further operation of said pulsing means to operate said party marking relay, control means selectively operated from said register to complete a circuit including said second source of potential and said first source of potential said first device in order to fire said first device, said second device rendered conductive in response to the firing of said first device, and means including said amplifiers connected to said plurality of resistors controlled by the operation of said second device to operate said amplifiers to operate said coding detectors, coding relay means in said coding detectors operated upon operation of said detector to operate said plural digit register to simultaneously register said plural digit station designation.

13. In a toll ticketing telephone system, a 10,000 terminal office, a plurality of subscriber party lines, each said party line having a plurality of party subscriber stations identified by a four-digit designation within said office and each equipped with a pulsing means, a first and a second two electrode gas filled electronic device individual to each of said stations, a station marking conductor connected to one of said electrodes of said first device for each party line subscriber station, a line marking conductor connected to one of said electrodes of each of said devices associated with a particular line, a group of four resistors individual to each said station, one terminal of all of said resistors connected to the other of said electrodes of said second device, said resistors each corresponding to one of the digits of said four digit designation to be detected, four groups of amplifiers, each group of amplifiers comprising ten amplifiers units, each amplifier unit in said group corresponding to a number from 1 through 9 and 0, each said amplifier including at least a transistor and an output transformer, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, each said coding detector including at least a transistor and a relay with a make contact assembly, said relay operatively connected to the collector of said transistor, means for connecting one of each of said four resistors to the base of said transistor of one of said amplifier units in each group of amplifiers, each of said resistors connected to the transistor of an amplifier corresponding to each of said digits of said four-digit designation of said subscriber station, a plural digit register, switching means directively controlled in response to said pulsing means upon initiation of a call from said station to connect said station to said register, a first source of potential, a second source of potential, a third source of potential, a plurality of party position marking relays, make contact means on each said party position marking relay, said make contact means operated by said party marking relay corresponding to said calling party position to apply said second potential to said party marking conductor, break contact means on each said party position marking relay, said break contacts effective on each said unoperated party position marking relay to extend said potential to each said electronic device not associated with said calling station, marking means in said register operated in response to said connection and the further operation of said pulsing means to operate said party marking relay, control means selectively operated from said register to complete a circuit including said second source of potential and said first source of potential and said first device in order to fire said first device, said second device rendered conductive in response to the firing of said first device, and means including said amplifiers connected to said plurality of resistors controlled by the operation of said second device to operate said amplifiers to operate said coding detectors, coding relay means in said coding dedectors operated upon operation of said detector to operate said plural digit register to simultaneously register said plural digit station designation.

14. In a tool ticketing telephone system, a 10,000 terminal office, a plurality of subscriber party lines, each said party line having a plurality of party subscriber stations identified by a four-digit designation within said office and each equipped with a pulsing means, a first and a second two electrode gas filled electronic device individual to each of said stations, a station marking conductor connected to one of said electrodes of said first device for each party line subscriber station, a line marking conductor connected to one of said electrodes of each of said devices associated with a particular line, a group of four resistors individual to each said station, one terminal of all of said resistors connected to the other of said electrodes of said second device, said resistors each corresponding to one of the digits of said four digit designation to be detected, four groups of amplifiers, each group of amplifiers comprising ten amplifier units, each amplier unit in said group corresponding to a number from 1 through 9 and 0, each said amplifier including at least a transistor and an output transformer, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, each said coding detector including at least a transistor and a relay with a make contact assembly, said relay operatively connected to the collector of said transistor, means for connecting one of each of said four resistors to the base of said transistor of one of said amplifier units in each said group of amplifiers, each of said resistors connected to the transistor of an amplifier corresponding to each of said digits of said four-digit designation of said subscriber station, a plural digit register, switching means directively controlled in response to said pulsing means upon initiation of a call from said station to connect said station to said register, a first source of potential, a second source of potential, a third source of potential, and a fourth source of potential, a plurality of party position marking relays, a potential switching relay, first make contact means on each said party position marking relay, second make contact means on each of said party position marking relay effective to complete a circuit to said switching relay, said first make contact means operated by said party marking relay corresponding to said calling party position to apply said second potential to said party marking conductor, said second make contact means operated to operate said switching relay, break contact means on each said party position marking relay, said third source of potential normally connected to said break contacts, said break contacts effective on each said unoperated party position marking relay to extend said potential from said potential switching relay to each said electronic device not associated with said calling station, said potential switching relay operated to remove said third source of potential from said back contacts and to apply said fourth source of potential, marking means in said register operated in response to said connection and the further operation of said pulsing means to operate said party marking relay, control means selectively operated from said register to complete a circuit including said second source of potential and said first source of potential and said first device in order to operate said second device, and means including said amplifiers connected to said plurality of resistors controlled by the operation of said second device to operate said amplifiers to operate said coding detectors, coding relay means in said coding detectors operated upon operation of said detector to operate said plural digit register to simultaneously register said plural digit station designation.

15. In a toll ticketing telephone system, a 10,000 terminal office, a plurality of subscriber party lines, each said party line having a plurality of party subscriber stations identified by a four-digit designation within said office and each equipped with a pulsing means, a first and a second multi electrode gas filled electronic device individual to each of said stations, a station marking conductor connected to one of said electrodes of said first device for each party line subscriber station, a line marking conductor connected to one of said electrodes of each of said devices associated with a particular line, a group of four resistors individual to each said station, one terminal of all of said resistors connected to another of said electrodes of said second device, said resistors each corresponding to one of the digits of said four-digit designation to be detected, four groups of amplifiers, each group of amplifiers comprising ten amplifier units, each amplifier unit in said group corresponding to a number from 1 through 9 and 0, each said amplifier including at least a transistor and an output transformer, a plurality of groups of coding detectors, each group of coding detectors comprising five detector units, each group of coding detectors associated with each group of amplifiers, each detector unit in said group of coding detectors corresponding to an element of a two-out-of-five element self-checking combinational code, each said coding detector including at least a transistor and a relay with a make contact assembly, rectifier means connecting said transformer to said transistors of said detectors said relay operatively connected to the collector of said transistor, means for connecting one of each of said four resistors to the base of said transistor of one of said amplifier units in each said group of amplifiers, each of said resistors connected to the transistor of an amplifier corresponding to each of said digits of said four-digit designation of said subscriber station, a plural digit register, switching means directively controlled in response to said pulsing means upon initiation of a call from said station to connect said station to said register, a first source of potential, a second source of potential, a third source of potential, and a fourth source of potential, a plurality of party position marking relays, a potential switching relay, back contacts in said switching relay first make contact means on each said party position marking relay, second make contact means on each of said party position marking relay effective to complete a circuit to said switching relay, said first make contact means operated by said party marking relay corresponding to said calling party position to apply said second potential to said party marking conductor, said second make contact means operated to operate said switching relay, break contact means on each said party position marking relay, said third source of potential normally connected to said break contacts, said break contacts effective on each said unoperated party position marking relay to extend said potential from said potential switching relay to each said electronic device not associated with said calling station, said potential switching relay operated to remove said third source of potential from said back contacts and to apply said fourth source of potential to said back contacts marking means in said register operated in response to said connection and the further operation of said pulsing means to operate said party marking relay, control means selectively operated from said register to complete a circuit including said second source of potential and said first source of potential and said first device in order to render said first device conductive, said second device rendered conductive in response to the conductivity of said first device, and means including said amplifiers connected to said plurality of resistors controlled by the operation of said second device to operate said amplifiers to operate said coding detectors, said relay and make contact means in said coding detectors operated upon operation of said detector to operate said plural digit register to simultaneously register said plural digit station designation.

References Cited in the file of this patent

UNITED STATES PATENTS

| | | |
|---|---|---|
| 2,672,515 | Barlow | Mar. 16, 1954 |
| 2,779,823 | Svala et al. | Jan. 29, 1957 |
| 2,857,470 | Faulkner | Oct. 21, 1958 |